(12) United States Patent
Guo et al.

(10) Patent No.: US 10,394,101 B2
(45) Date of Patent: Aug. 27, 2019

(54) BACKLIGHT MODULE, DISPLAY APPARATUS AND ILLUMINATION APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Yuanhui Guo, Beijing (CN); Bingbing Wu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 38 days.

(21) Appl. No.: 15/208,565

(22) Filed: Jul. 12, 2016

(65) Prior Publication Data
US 2017/0235174 A1    Aug. 17, 2017

(30) Foreign Application Priority Data
Feb. 14, 2016   (CN) .......................... 2016 1 0084823

(51) Int. Cl.
*G02F 1/139* (2006.01)
*F21V 8/00* (2006.01)
(Continued)

(52) U.S. Cl.
CPC ........... *G02F 1/1393* (2013.01); *G02B 6/005* (2013.01); *G02F 1/1368* (2013.01);
(Continued)

(58) Field of Classification Search
CPC ..................................................... G02F 1/1393
See application file for complete search history.

(56) References Cited

U.S. PATENT DOCUMENTS

2012/0320292 A1* 12/2012 Guo ...................... G02F 1/1396
                                                                  349/15
2013/0135558 A1*  5/2013 Kim .................. G02F 1/133528
                                                                  349/62
(Continued)

FOREIGN PATENT DOCUMENTS

CN        1916707 A     2/2007
CN      101191921 A     6/2008
(Continued)

OTHER PUBLICATIONS

First Chinese Office Action, for Chinese Patent Application No. 201610084823.6, dated Mar. 13, 2018, 12 pages.

*Primary Examiner* — Sang V Nguyen
(74) *Attorney, Agent, or Firm* — Kinney & Lange, P.A.

(57) ABSTRACT

The present disclosure provides a backlight module, a display apparatus and an illumination apparatus. The backlight module includes: a light guide plate; a light emitting diode arranged above the light guide plate; an optical film layer arranged above the light emitting diode; a film of material with a polarization orientation arranged above the optical film layer; a liquid crystal cell arranged above the film of material; and a polarizer arranged above the liquid crystal cell. The liquid crystal cell includes an upper electrode and a lower electrode and a liquid crystal layer between the upper electrode and the lower electrode and the liquid crystal layer is capable of changing polarization state of a light passing through the liquid crystal cell, by the control of a voltage applied between the upper electrode and the lower electrode.

20 Claims, 5 Drawing Sheets

(51) Int. Cl.
  *G02F 1/133*  (2006.01)
  *G02F 1/1335*  (2006.01)
  *G02F 1/1343*  (2006.01)
  *G02F 1/1368*  (2006.01)
(52) U.S. Cl.
  CPC .... *G02F 1/13306* (2013.01); *G02F 1/133528* (2013.01); *G02F 1/133621* (2013.01); *G02F 1/134309* (2013.01); *G02F 2001/133614* (2013.01); *G02F 2202/36* (2013.01)

(56) References Cited

U.S. PATENT DOCUMENTS

| | | | | |
|---|---|---|---|---|
| 2014/0009902 A1* | 1/2014 | Banin | ............... | G02F 1/133617 362/19 |
| 2014/0184984 A1* | 7/2014 | Kim | ............... | G02F 1/1334 349/61 |
| 2016/0085118 A1* | 3/2016 | Lee | ............... | G02F 1/133512 349/62 |
| 2016/0091641 A1* | 3/2016 | Tseng | ............... | G02B 5/201 257/13 |
| 2016/0246085 A1* | 8/2016 | Zhong | ............... | G02F 1/1334 |
| 2016/0300535 A1* | 10/2016 | Gilbert | ............... | G09G 3/36 |
| 2017/0031194 A1* | 2/2017 | Banin | ............... | G02F 1/133606 |
| 2017/0045780 A1* | 2/2017 | Xu | ............... | G02F 1/133621 |
| 2017/0108726 A1* | 4/2017 | Yanai | ............... | G02B 5/30 |
| 2017/0261788 A1* | 9/2017 | Cheng | ............... | G02F 1/1362 |
| 2017/0277002 A1* | 9/2017 | Yamada | ............... | C08K 3/30 |

FOREIGN PATENT DOCUMENTS

| | | |
|---|---|---|
| CN | 204439978 U | 7/2015 |
| CN | 104965341 A | 10/2015 |
| CN | 105116595 A | 12/2015 |
| CN | 105301828 A | 2/2016 |

* cited by examiner

BACKLIGHT MODULE, DISPLAY APPARATUS AND ILLUMINATION APPARATUS

CROSS-REFERENCE TO RELATED APPLICATION(S)

This application claims benefit of Chinese Application No. 201610084823.6, filed with SIPO on Feb. 14, 2016, incorporated herein by reference in their entirety.

BACKGROUND OF THE DISCLOSURE

Field of the Disclosure

The present disclosure generally relates to the field of electronics, and in particular, to a backlight module, a display apparatus and an illumination apparatus.

Description of the Related Art

In the technical field of display, a liquid crystal display panel has advantages such as small volume, low power consumption, no radiation and high resolution, and is applied widely in a modern digital information apparatus.

In comparison with other display modes such as a plasma display panel (PDP), an organic light emitting diode (OLED) display, a thin film transistor (TFT) liquid crystal display (LCD) uses a passive light emitting mode, with a white light emitting diode (LED) as a light source and thus may cause low color range and color distortion of products.

The color range of the TFT-LCD products may be enhanced by increasing thickness of color filter layer and using LEDs with higher color range. However, when the color range of the product is enhanced, the backlight brightness may be reduced and the transmittivity of the color filter layer may be reduced, resulting in an increase of power consumption of the panel.

Currently, the backlight uses quantum dot technology, which may enhance the color range of the backlight efficiently. If a green light and a red light are excited by a blue light, the peak intensities of the green light and the red light may be controlled by controlling species and radius of particles. The stronger peak intensities of the green light and the red light may enhance the color range more significantly, but may cause the brightness to be reduced and the backlight to become yellow. In comparison with quantum dots, quantum rods have polarization orientations. The structure of quantum rods is shown in FIG. 1.

SUMMARY

An embodiment of the present application provides a backlight module including: a light guide plate; a light emitting diode arranged above the light guide plate; an optical film layer arranged above the light emitting diode; a film of material with a polarization orientation arranged above the optical film layer; a liquid crystal cell arranged above the film of material; and a polarizer arranged above the liquid crystal cell, wherein the liquid crystal cell includes an upper electrode and a lower electrode and a liquid crystal layer between the upper electrode and the lower electrode and the liquid crystal layer is capable of changing the polarization state of a light passing through the liquid crystal cell, by the control of a voltage applied between the upper electrode and the lower electrode.

An embodiment of the present application provides a display apparatus including the backlight module provided by the above embodiment.

An embodiment of the present application provides an illumination apparatus including the backlight module provided by the above embodiment.

DETAILED DESCRIPTION OF PREFERRED EMBODIMENTS OF THE INVENTION

The embodiments of the present invention will be further explained below with reference to the figures and examples such that the objects, technical solutions and advantages of the present application will become more apparent.

An embodiment of the present application provides a backlight module including: a light guide plate; a light emitting diode arranged above the light guide plate; an optical film layer arranged above the light emitting diode; a film of material with a polarization orientation arranged above the optical film layer; a liquid crystal cell arranged above the film of material; and a polarizer arranged above the liquid crystal cell, wherein the liquid crystal cell includes an upper electrode and a lower electrode and a liquid crystal layer between the upper electrode and the lower electrode and the liquid crystal layer is capable of changing the polarization state of a light passing through the liquid crystal cell, by the control of a voltage applied between the upper electrode and the lower electrode.

The embodiments of the present application will below be explained with reference to figures. In addition, for the purpose of explanation, numerous specific details are set forth in the following detailed description to provide a thorough understanding to the embodiments of the present application. It is obvious, however, that one or more embodiments can also be implemented without these specific details. In other instances, well-known structures and devices are shown in an illustrative manner so as to simplify the drawings.

Figure 3:
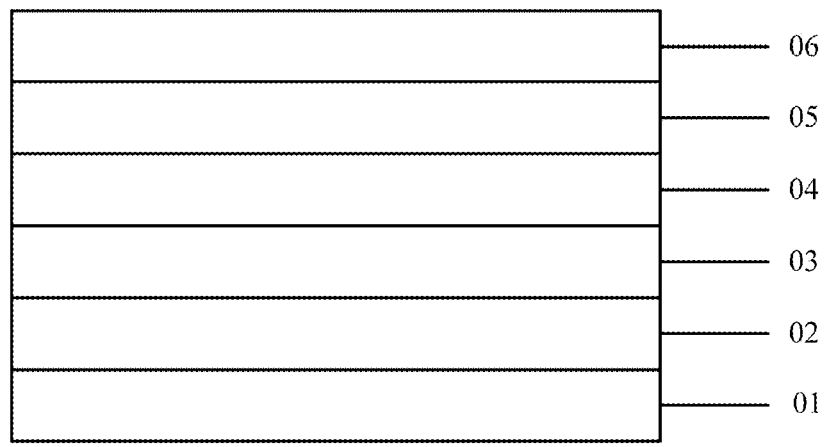
FIG. 3 is a schematic view showing a structure of a backlight module according to an embodiment of the present application.

With reference to FIG. 3, an embodiment of the present application provides a backlight module. It includes: a light guide plate 01; a light emitting diode (LED) 02 arranged above the light guide plate; an optical film layer 03 arranged above the light emitting diode; a film 04 of material with a polarization orientation arranged above the optical film layer 03; a liquid crystal cell 05 arranged above the film of material; and a polarizer 06 arranged above the liquid crystal cell. The liquid crystal cell includes an upper electrode and a lower electrode and a liquid crystal layer between the upper electrode and the lower electrode and the liquid crystal layer is capable of changing the polarization state of a light (for example, a light emitted from the LED) passing through the liquid crystal cell, by the control of a voltage applied between the upper electrode and the lower electrode. In the example, the above liquid crystal cell 05 will also be called as a backlight liquid crystal cell or a first liquid crystal cell below, so as to distinguish it from a liquid crystal cell for displaying a picture in a display panel.

By means of the backlight module, the liquid crystal cell is added above the film of material with polarization orientation. By controlling the voltage between electrodes of the liquid crystal cell, the polarization state of the light passing through the liquid crystal cell may be controlled, for example, by regulating the alignment of the liquid crystal. In this way, the spectrum of the backlight (for example the light emitted from the LED) having passed through the polarizer may have various modes, such as high color range mode and high brightness mode, so as to achieve dynamic control of the spectrum of the backlight. It allows the backlight module to be applied in for example image display and illumination fields, so as to enlarge the application field.

Figure 1:
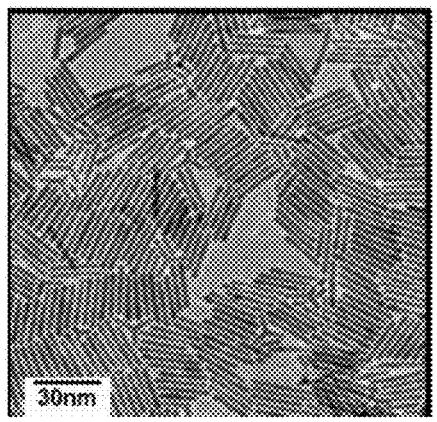
FIG. 1 is a schematic view showing a structure of quantum rods under a microscope in the prior art.
Figure 2:
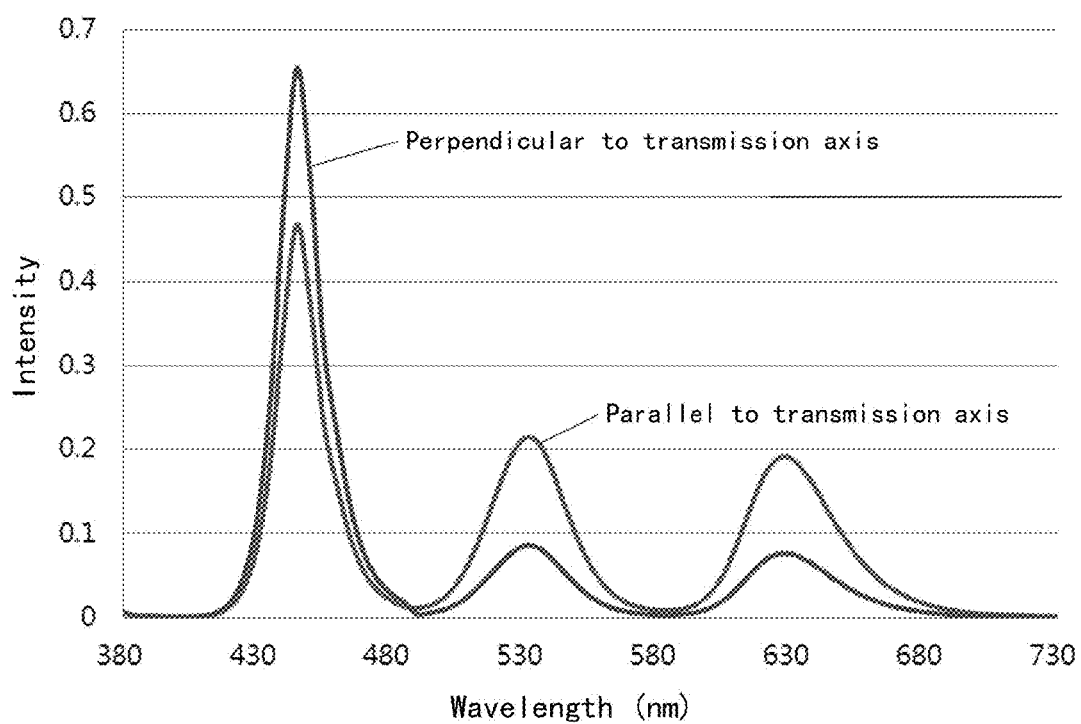
FIG. 2 is a schematic view showing a backlight emission spectrum of the film with quantum rods which are arranged in a direction parallel to transmission axis of a polarizer and a backlight emission spectrum of the film with quantum rods which are arranged in a direction perpendicular to transmission axis of the polarizer in the prior art.

As an example, the film of material with the polarization orientation (for example, orientation corresponding to the polarization state of the light) may include a film of quantum rod material. When the quantum rods are aligned in a direction parallel to a transmission axis of the polarizer, the backlight from the backlight module with the film of quantum rod material will have high color range. In contrast, when the quantum rods are aligned in a direction perpendicular to the transmission axis of the polarizer, the backlight from the backlight module with the film of quantum rod material will have low color range. Examples of the emission spectra of the backlight corresponding to the above two alignment directions are shown in FIG. 2. However, the embodiments of the present application are not limited to this. For example, any films of quantum rod material with other forms of emission spectra may also be used.

As an example, the light emitting diode is a blue light emitting diode and the film of quantum rod material is a polymer film containing red and/or green quantum rod material.

As an example, the backlight liquid crystal cell is a twisted nematic (TN) liquid crystal cell or an in-plane switching (IPS) liquid crystal cell or a fringe field switching (FFS) liquid crystal cell.

As an example, the backlight liquid crystal cell further includes an upper transparent substrate arranged above the upper electrode and a lower transparent substrate arranged below the lower electrode and the upper transparent substrate has an alignment direction perpendicular to an alignment direction of the lower transparent substrate. For example, the above upper transparent substrate and the above lower transparent substrate may both be made from glass or other transparent materials.

Figure 4:
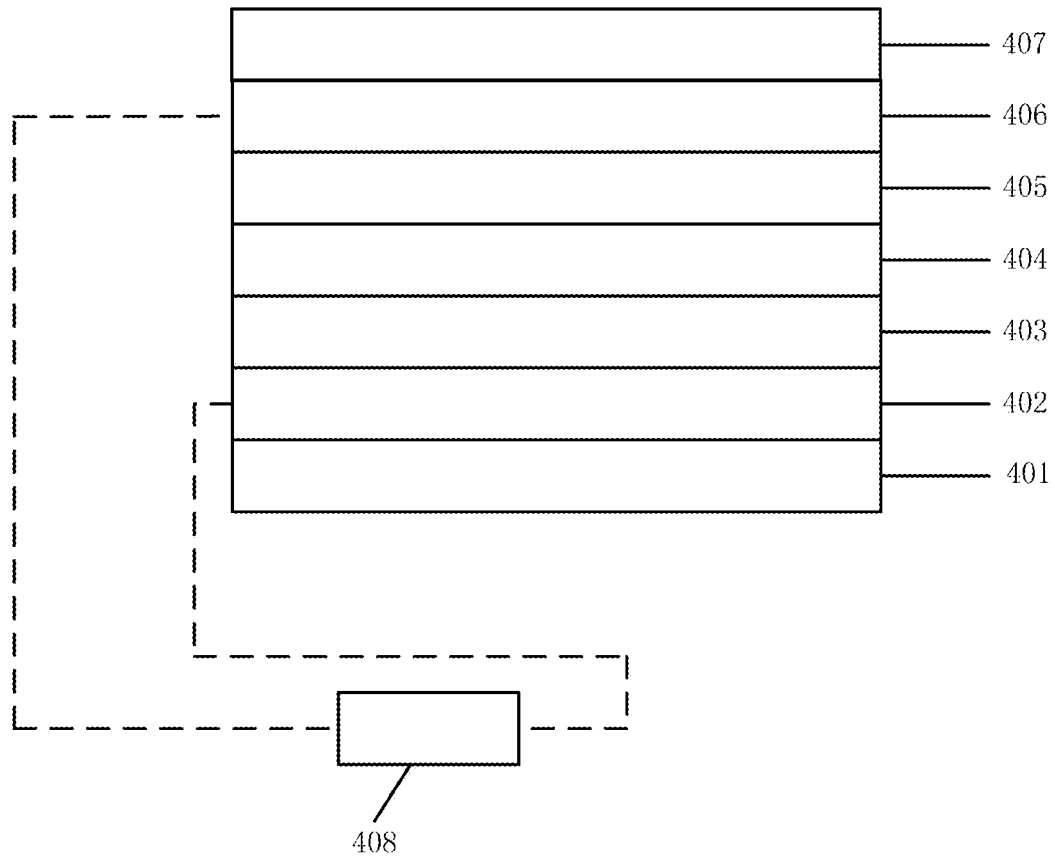
FIG. 4 is a schematic view showing a structure of a backlight liquid crystal cell according to an embodiment of the present application.

As an example, as illustrated in FIG. 4, the backlight liquid crystal cell 05 includes the lower transparent substrate 401, the lower electrode 402, a lower alignment film 403, a liquid crystal layer 404, an upper alignment film 405, the upper electrode 406 and the upper transparent substrate 407 arranged from bottom to top.

As an example, the backlight module provided by the embodiment of the present application further includes: a controller 408 configured to control the voltage applied between the upper electrode and the lower electrode.

The controller may for example be a processor. The processor may be a central processing unit (CPU), an application specific integrated circuit (ASIC), a field programmable gate array (FPGA) or a complex programmable logic device (CPLD).

Figure 5:
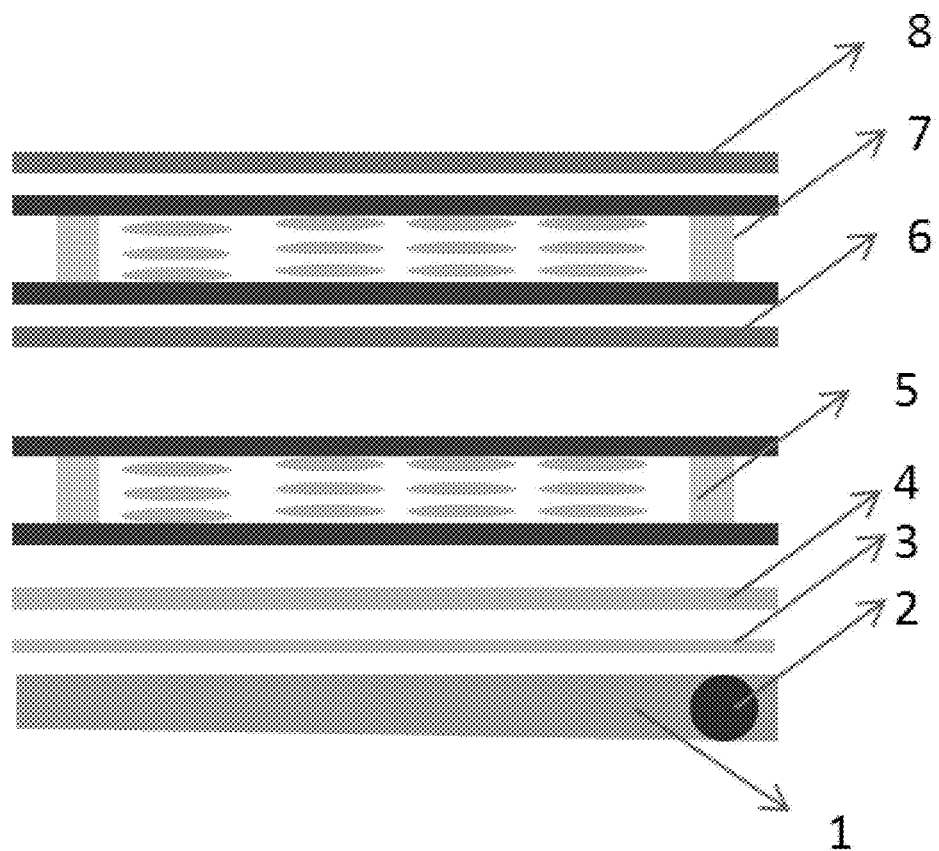
FIG. 5 is a schematic view showing a structure of a TFT-LCD according to an embodiment of the present application.

As illustrated in FIG. 5, when the backlight module is applied in the picture display field, a display apparatus provided by an embodiment of the present application is for example, a thin film transistor liquid crystal display screen (TFT-LCD). The display apparatus may include a light guide plate 1, a LED 2 (for example blue LED), the optical film layer 3, the film 4 of quantum rod material, the backlight liquid crystal cell 5, the polarizer 6, a panel liquid crystal cell 7 (may also be called as a second liquid crystal cell) for displaying a picture and a polarizer 8. By means of the polarization orientation characteristics of the quantum rods, the color range and white dot color coordinates of the panel with the above backlight module may be regulated arbitrarily by adjusting the backlight liquid crystal cell 5, thereby enlarging the application field of the product.

In an example, the film of quantum rod material may be a polymer film containing red and green quantum rod materials. The emission wavelengths of the film of quantum rod material may be adjusted by changing diameters and species of the quantum rods. The quantum rods in the film of quantum rod material may for example be aligned in a direction parallel to the transmission axis of the lower polarizer in the panel.

Figure 6:
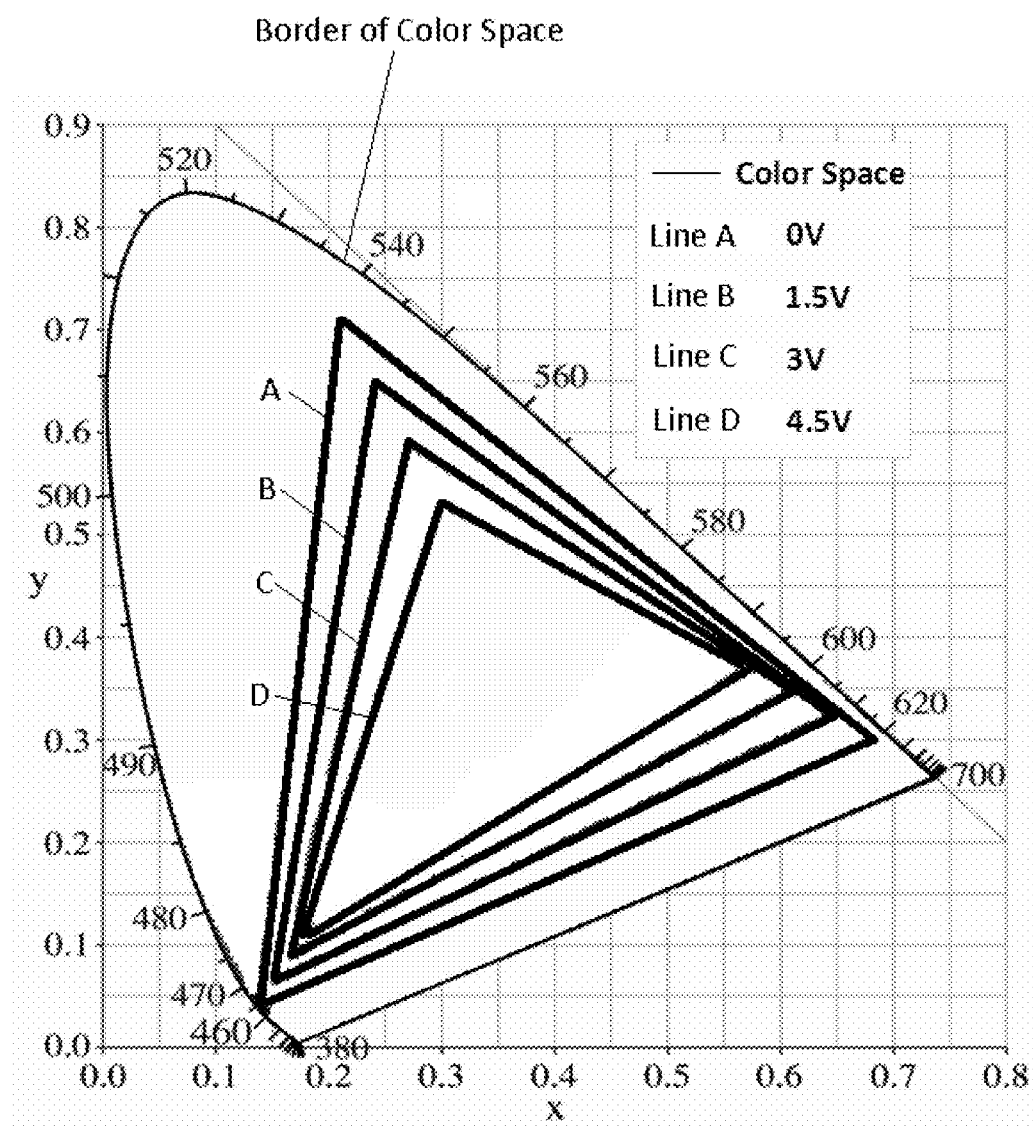
FIG. 6 is a schematic view showing maximum color range distributions of a panel according to an embodiment of the present application in case that the voltage difference between the upper electrode and the lower electrode of a TN liquid crystal cell are changed.

In an example, the upper electrode and the lower electrode of the backlight liquid crystal cell are in form of continuous columns and divided as a positive pole and a negative pole. The polarization orientation of the liquid crystal in the backlight liquid crystal cell may be controlled by regulating the voltage difference between the positive pole and the negative pole. The backlight liquid crystal cell may be a TN liquid crystal cell, or may be a FFS liquid crystal cell. Taking the TN liquid crystal cell as an example, the alignment direction of the upper transparent substrate is perpendicular to that of the lower transparent substrate in the TN liquid crystal cell. Only by changing the voltage difference between the upper electrode and the lower electrode in the TN liquid crystal cell, the alignment of the liquid crystal in the TN liquid crystal cell may be controlled to alter the polarization state of the light passing through the liquid crystal cell. The maximum color range distributions are tested for different voltage differences between the upper electrode and the lower electrode in the TN liquid crystal cell in the panel. In an example, the maximum color range distributions for different voltage differences are represented by a plurality of triangular regions in FIG. 6. In FIG. 6, Line A, Line B, Line C and Line D indicate color ranges corresponding to voltage differences of 0V, 1.5V, 3V and 4.5V, respectively. As shown, it can be determined that, when the voltage difference is 0V, the color range of the product becomes maximum, i.e., 110% (for example normalized by a reference value) and the panel L255 has a brightness of 200 nit; and when the voltage difference is 4.5V, the alignment of the liquid crystal in the backlight liquid crystal cell corresponds to the polarization state of light and the color range becomes 42% and the panel L255 has a brightness of 350 nit.

In the embodiment of the present application, the spectra of the light passing through the lower polarizer may be converted between the high color range mode and the high brightness mode by controlling the voltage difference of the backlight liquid crystal cell and the alignment of the liquid crystal to further regulate the angle between the lower polarizer and the orientation in which the quantum rods are aligned to enhance the color range. In this way, the application field of the product may be enhanced. For a certain application, for example, design application, the high color range is required and the backlight module may be adjusted to be in the high color range mode. In contrast, in other applications for example a general field, in order to increase the lifetime of the product and to reduce power consumption, the high brightness mode is used.

Figure 7:
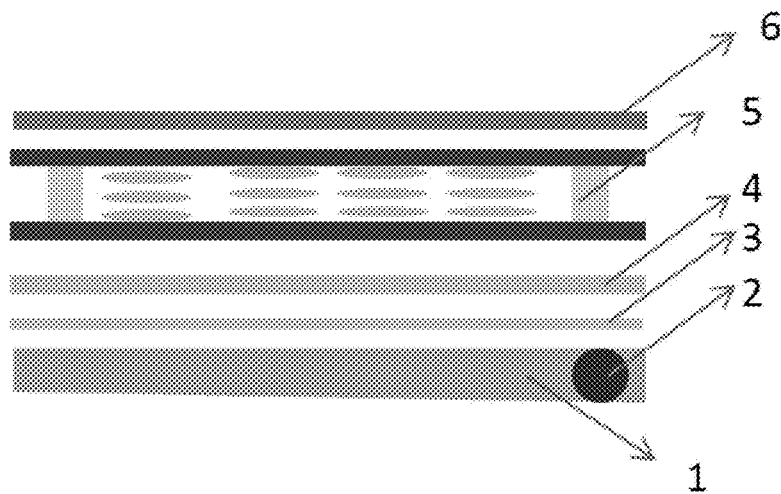
FIG. 7 is a schematic view showing a structure of an illumination apparatus according to an embodiment of the present application.
Figure 8:
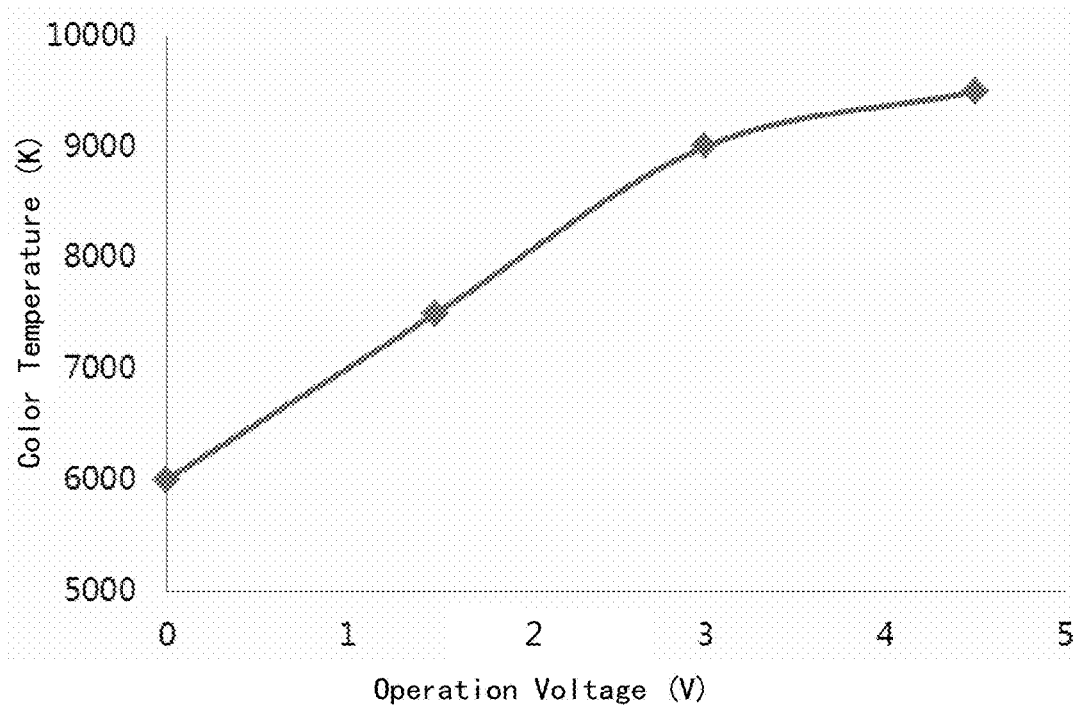
FIG. 8 is a schematic view showing fluctuation of color temperature of the illumination apparatus according to an embodiment of the present application as the voltage difference between the upper electrode and the lower electrode of a backlight liquid crystal cell varies.

In an example, when the backlight module is applied in the illumination field, an illumination apparatus is provided by an embodiment of the present application, as illustrated in FIG. 7. The illumination apparatus may include a light guide plate 1, a LED 2 (for example blue LED), the optical film layer 3, the film 4 of quantum rod material, the backlight liquid crystal cell 5, and the polarizer 6. The backlight liquid crystal cell 5 is a TN liquid crystal cell in which the alignment direction of the upper transparent substrate is perpendicular to that of the lower transparent substrate. Only by changing the voltage difference between the upper electrode and the lower electrode in the backlight liquid crystal cell 5, the alignment of the liquid crystal in the TN liquid crystal cell may be controlled to alter the polarization state of the light passing through the liquid crystal cell. In this way, the color temperature of the illumination apparatus may also be regulated. It may allow the illumination apparatus to meet the requirements for illumination in different color temperatures and different brightness in combination with the control of current of the blue LED. As the voltage difference between the upper electrode and the lower electrode in the backlight liquid crystal cell 5 varies, the color temperature of the illumination apparatus fluctuates, as illustrated in FIG. 8.

In summary, embodiments of the present application provide a backlight module, a display apparatus and an illumination apparatus. By means of adding the liquid crystal cell above the film of quantum rod material, the voltage between electrodes of the liquid crystal cell is controlled to regulate the polarization state of the light passing through the liquid crystal cell. In this way, the spectrum of the backlight (for example the light emitted from the LED) having passed through the polarizer may have various modes, such as high color range mode and high brightness mode, so as to achieve dynamic control of the spectrum of the backlight and to enlarge the application field.

It should be noted for those skilled in the art that the terms herein for describing directions, for example "upper", "lower", "left" and "right" or the like are given by way of examples, with reference to the directions in which the products are arranged in figures. However, the embodiments of the present application are not limited by the directions in which the products are arranged in figures. In contrast, in the embodiments of the present application, the products or parts may be arranged in any directions appreciated by the skilled person in the art.

The skilled person in the art will appreciate that the embodiments of the present application may be implemented as methods, systems or computer program products. Thus, the present application may be implemented in form of pure hardware embodiments, pure software embodiments or combination of software and hardware embodiments. And the present application may use the form of computer program products implemented on one or more computer readable storage media (including, but not limited to, such as magnetic memory and optical memory) in which computer applicable program codes are contained.

The present application is described with reference to the flow charts and/or block diagrams of the methods, apparatuses (system) and computer program products according to embodiments of the present application. It should be understood that each flow and/or block in the flow chart and/or block diagram and combinations of flow and/or block in the flow chart and/or block diagram may be implemented as computer program instructions. These computer program instructions may be provided to processors of a general computer, a dedicated computer, an embedded processing device or other programmable data process apparatuses to generate a machine such that the instructions that are executed by the processor of the computer or other programmable data process apparatus generate means for achieving specified functions in one or more flows of the flow chart and/or one or more blocks of the block diagram.

These computer program instructions may also be stored in a computer readable memory that can guide the computer or other programmable data process apparatus to work in a certain manner, such that the instructions stored in the computer readable memory generate manufactures including instruction devices. The instruction devices may achieve the specified functions in one or more flows of the flow chart and/or one or more blocks of the block diagram.

These computer program instructions may also be loaded on the computer or other programmable data process apparatus, such that a series of operation steps may be executed on the computer or other programmable apparatuses to generate computer implementable processes. In this way, the instructions executed on the computer or other programmable apparatus may provide steps of achieving the specified functions in one or more flows of the flow chart and/or one or more blocks of the block diagram.

It would be appreciated by those skilled in the art that various changes and modifications may be made in the present application without departing from the principles and spirit of the present application. These changes and modifications will also fall within the scope of the present application, delimited by appended claims and equivalents thereof.

What is claimed is:

1. A backlight module comprising:
a light guide plate;
a light emitting diode arranged above the light guide plate;
an optical film layer arranged above the light emitting diode;
a film of material with a polarization orientation arranged on a side of the optical film layer facing way from the light guide plate;
a liquid crystal cell arranged on a side of the film of material facing away from the light guide plate; and
a polarizer arranged on a side of the liquid crystal cell facing away from the light guide plate, the liquid crystal cell being between the polarizer and the film of material, wherein the liquid crystal cell comprises an upper electrode, a lower electrode and a liquid crystal layer between the upper electrode and the lower electrode, and the liquid crystal layer is capable of changing polarization state of a light passing through the liquid crystal cell by control of a voltage applied between the upper electrode and the lower electrode, and wherein no polarizers are provided between the liquid crystal cell and the film of material.

2. The backlight module according to claim 1, wherein the film of material with the polarization orientation comprises a film of quantum rod material.

3. The backlight module according to claim 2, wherein the light emitting diode is a blue light emitting diode and the film of quantum rod material is a polymer film containing red or green quantum rod material, or a combination of red and green quantum rod material.

4. The backlight module according to claim 1, wherein the liquid crystal cell is a twisted nematic liquid crystal cell, an in-plane switching liquid crystal cell or a fringe field switching liquid crystal cell.

5. The backlight module according to claim 1, wherein the liquid crystal cell further comprises an upper transparent substrate arranged above the upper electrode and a lower transparent substrate arranged below the lower electrode, and the upper transparent substrate has an alignment direction perpendicular to an alignment direction of the lower transparent substrate.

6. The backlight module according to claim 1, further comprising a controller configured to control the voltage applied between the upper electrode and the lower electrode.

7. A display apparatus comprising the backlight module according to claim 1.

8. The display apparatus according to claim 7, wherein the film of material with the polarization orientation comprises a film of quantum rod material.

9. The display apparatus according to claim 8, wherein the light emitting diode is a blue light emitting diode and the film of quantum rod material is a polymer film containing red and/or green quantum rod materials.

10. The display apparatus according to claim 7, wherein the liquid crystal cell is a twisted nematic liquid crystal cell, an in-plane switching liquid crystal cell or a fringe field switching liquid crystal cell.

11. The display apparatus according to claim 7, wherein the liquid crystal cell further comprises an upper transparent substrate arranged above the upper electrode and a lower transparent substrate arranged below the lower electrode, and the upper transparent substrate has an alignment direction perpendicular to an alignment direction of the lower transparent substrate.

12. The display apparatus according to claim 7, wherein the backlight module further comprises a controller configured to control the voltage applied between the upper electrode and the lower electrode.

13. A display apparatus comprising:
a backlight module comprising:
a light guide plate;
a light emitting diode arranged above the light guide plate;
an optical film layer arranged above the light emitting diode;
a film of material with a polarization orientation arranged on a side of the optical film layer facing away from the light guide plate;
a first liquid crystal cell arranged on a side of the film of material facing away from the light guide plate; and
a lower polarizer arranged on a side of the first liquid crystal cell facing away from the light guide plate, the first liquid crystal cell being between the lower polarizer and the film of material;
a second liquid crystal cell arranged on a side of the lower polarizer facing away from the first liquid crystal cell and configured to display a picture; and
an upper polarizer arranged on a side of the second liquid crystal cell facing away from the lower polarizer,
wherein the first liquid crystal cell comprises an upper electrode, a lower electrode and a liquid crystal layer between the upper electrode and the lower electrode, and wherein the first liquid crystal cell is controlled by a voltage applied between the upper electrode and the lower electrode, and
wherein no polarizers are provided between the first liquid crystal cell and the film of material.

14. The display apparatus according to claim 7, wherein the display apparatus comprises a thin film transistor liquid crystal display screen.

15. An illumination apparatus comprising the backlight module according to claim 1.

16. The illumination apparatus according to claim 15, wherein the film of material with the polarization orientation comprises a film of quantum rod material.

17. The illumination apparatus according to claim 16, wherein the light emitting diode is a blue light emitting diode and the film of quantum rod material is a polymer film containing red and/or green quantum rod materials.

18. The illumination apparatus according to claim 15, wherein the liquid crystal cell is a twisted nematic liquid crystal cell, an in-plane switching liquid crystal cell or a fringe field switching liquid crystal cell.

19. The illumination apparatus according to claim 15, wherein the liquid crystal cell further comprises an upper transparent substrate arranged above the upper electrode and a lower transparent substrate arranged below the lower electrode, and the upper transparent substrate has an alignment direction perpendicular to an alignment direction of the lower transparent substrate.

20. The illumination apparatus according to claim 15, wherein the backlight module further comprises a controller configured to control the voltage applied between the upper electrode and the lower electrode.

* * * * *